Patented June 6, 1939

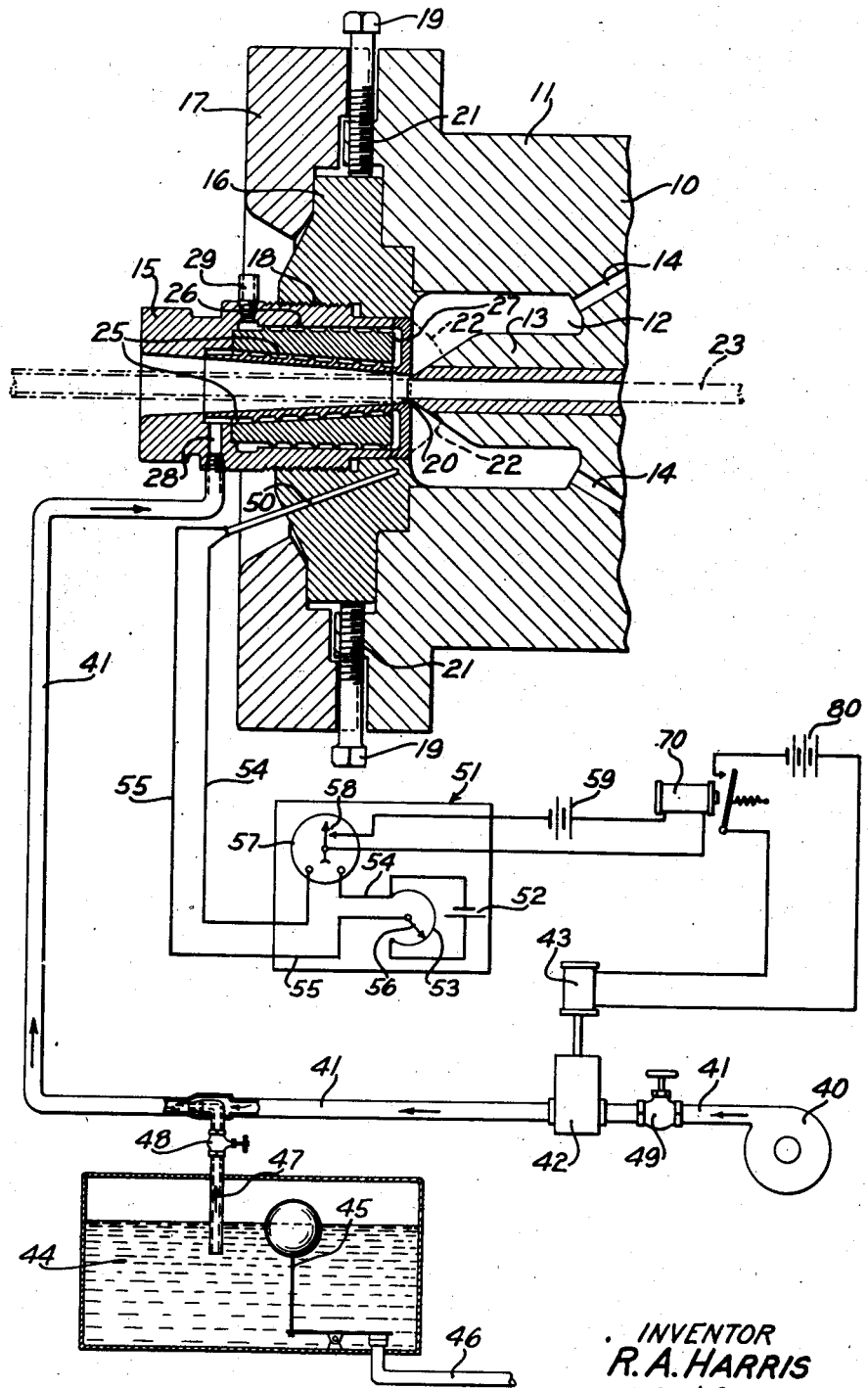

2,161,570

UNITED STATES PATENT OFFICE 2,161,570

COOLING SYSTEM

Robert A. Harris, Oak Park, Ill., assignor to Western Electric Company, Incorporated, New York, N. Y., a corporation of New York Application April 23, 1936, Serial No. 76,029

7 Claims. (Cl. 207—16)

This invention relates to cooling systems, and more particularly to apparatus for cooling molten matter.

There is described in the copending application of E. W. Larsen, Serial No. 637,465, filed October 12, 1932, now United States Patent 2,084,149 a press for continuously extruding lead or lead alloy sheath on an electric cable. In this type of extrusion machine the material to be extruded is fed to the machine in molten form under pressure and reduced to plastic form as it progresses through the machine by the dissipation of heat. For economy in the use of power and to avoid excessive size of apparatus it is desirable to restrict the portion of material which is in plastic form to the smallest possible volume consistent with the necessity for constantly maintaining such portion large enough to prevent a blowout of molten material at the extrusion orifice. This result is best accomplished by a controlled application of an efficient cooling medium to the machine at points near the extrusion orifice.

Objects of the invention are to provide economical and efficient apparatus for effecting and controlling the rapid dissipation of heat from heated material.

In accordance with one embodiment of this invention the dissipation of heat in a machine of the type above described is effected and controlled by the introduction of atomized water in regulated quantities into chambers in the wall of the machine. Vaporization of the entrained water utilizes heat rapidly and the quantity of heat withdrawn from the extrudable material is controlled by regulating the circulation of the atomized water in accordance with the thermal condition of the material.

Other features and advantages of the invention will more fully appear from the following detailed description taken in connection with the accompanying drawing, in which the single figure is a longitudinal section through a portion of an extrusion machine provided with a cooling system embodying the invention; the mechanism for preparing and circulating the coolant being shown diagrammatically.

In the accompanying drawing the reference numeral 10 designates a casting containing the extrusion chamber of a machine of the type described in detail in the copending patent application referred to above. The construction and operation of the machine conform in general with the description in the above cited application which is briefly as follows: The external wall 11 of the casting 10 substantially encloses an annular chamber 12 which contains the extrudable material. A core tube 13 extends longitudinally throughout the length of the chamber 12. At the rear of the chamber 12 are a plurality of tubular ducts 14 through which the material to be extruded is fed in molten form under substantial pressure supplied by a pump or other suitable means (not shown). At the front end of the chamber 12, a die 15 is positioned with its inlet opening adjacent to and concentric with the end of the core tube 13 at 20. The die 15 is carried in a disk-shaped holder 16 which is secured to the face of the casting 10 by means of a retaining ring 17 and bolts (not shown). The die 15 is an elongated hollow cylinder in form and is positioned in the holder 16 by means of a threaded portion 18 on its outer periphery engaging corresponding threads in the die holder 16. The position of the inlet die opening with respect to the core tube end 20 and the resultant contour of the extruded cable sheath is regulated by means of the threaded portion 18 on the die periphery and a plurality of centering bolts 19 adjustably supported in threaded lugs 21 on the face of the casting 10.

The machine described is particularly suitable for the application of lead or alloy sheath on cable. In the operation of the machine the extrudable material introduced through the ducts 14 is forced through the chamber 12 under pressure and reduced from a molten to a plastic condition as it progresses through the chamber by the dissipation of heat. Broken lines 22 indicate the portion of material adjacent to the die opening that is maintained in a plastic condition. The cable or other object 23 to be covered is fed through the core tube 13 and the plastic material at the front of the chamber is forced through the space between the die opening and the core tube to form the sheath around the cable as it emerges from the core tube.

In accordance with a feature of this invention the material at the die opening is rapidly and accurately conditioned for efficient extrusion by subjecting the adjacent portion of the extrusion chamber to a stream of atomized liquid. Accurate conformation of the extruded material to the opening between the die and core tube and the quality of the resultant product are largely determined by the thermal condition of the material at this point. If the temperature is not uniform around the periphery of the die opening a distorted and eccentric sheath will result. Also, the desirable temperature range is critical because the material will blow through the die if insufficiently cooled and excessive cooling will increase the extrusion pressure beyond practical limits with resultant interruptions in the process, damage to the apparatus, or both. For maximum operating efficiency the portion of the charge that is reduced to a plastic condition should be continuously restricted to the area immediately adjacent to the extrusion orifice.

For these reasons a temperature regulating medium that can be introduced rapidly and in controlled quantities to localize and maintain the plastic mass is highly desirable. These qualities are provided in the apparatus and method described herein in which atomized water is introduced into chambers in the wall of the die in quantities determined by the thermal condition of the extrudable material in accordance with the following detailed description.

The atomized water is circulated through chambers in the wall of the die 15. Two channel shaped ducts 25 and 26 progress longitudinally in the die wall in the form of a helix and terminate in an annular chamber 27 located in the wall of the die adjacent to the chamber 12 which contains the extrudable material. At the outer end of the helical duct 25 is an opening 28 for the introduction of the atomized water and a port 29 is provided at the end of the helical duct 26 for exhausting the coolant. In order to control the temperature of the material at the die opening accurately the annular chamber 27 is located as closely as practicable to the rear wall of the die and the extrudable material. The chamber 27 is also enlarged to accommodate a large quantity of the coolant and thereby facilitate its action at that location. Circulation of the coolant in the helical ducts 25 and 26 in regulated quantities assists in controlling the temperature of the material by aiding in the prompt withdrawal of heat from the die region.

When the atomized water enters the chamber in the die wall it is vaporized by heat from the extrudable material and the adjacent machine members. The resultant vapor is discharged through the port 29. This vaporizing action withdraws heat in proportion to the quantity of vapor formed as determined by the latent heat of vaporization of the atomized water. As this value is high, the temperatures of the machine members and the extrudable material respond rapidly to the cooling action and a prompt change in thermal condition of the extrudable material is effected when the atomized water is introduced. The high velocity of the atomized water facilitates its rapid introduction to all portions of the annular die chamber 27 and insures uniform application of the cooling action.

The atomized water may be prepared and circulated with the apparatus shown in the drawing. A quantity of air is supplied under pressure from a blower 40 or other suitable source. The air is conducted through a pipe line 41 which includes a magnetic valve 42 adjacent to the blower 40. The magnetic valve 42 is operated by a spring biased solenoid 43 to control circulation in the pipe line 41. From the blower the air is conducted in the pipe 41 over a container in which a supply of water 44 is maintained at a predetermined level by means of a float valve 45 in a water supply line 46. A section of open ended pipe 47 extends vertically from beneath the surface of the water 44 into the pipe 41 through a suitable seal. The open end portion of the pipe 47 which projects into an enlarged section in the pipe 41 is bent into a position parallel with the stream of air passing through the pipe 41. When air is flowing in the pipe 41 an aspirator action is thus developed which entrains particles of water in the air. The character of the mixture is controlled with a regulating valve 48 in the pipe 47 and a regulating valve 49 in the air supply pipe 41. The atomized water formed in this manner is conducted under pressure supplied by the blower 40 through the pipe line 41 to the inlet 28, and through the ducts and chambers in the die wall 25, 27 and 26 in order. Vaporization of the entrained water takes place within these chambers and the resultant vapor is discharged into the atmosphere through the port 29.

Circulation of the atomized water is controlled by the condition of the magnetic valve 42 which is opened or closed in accordance with the thermal condition of the extrudable material at the extrusion orifice. The temperature at that location is measured with a thermocouple 50 connected electrically to a potentiometer controller 51 of conventional construction. In the potentiometer circuit within the controller 51 a battery 52 is connected in series with resistance wire 53 of a slide wire rheostat. One of the leads 54 from the thermocouple 50 is connected to one terminal of the resistance wire 53 and the other thermocouple lead 55 is connected to a variable arm 56 of the rheostat. With this arrangement the electromotive force generated by the thermocouple opposes the electromotive force in the potentiometer circuit supplied by the battery 52. When these forces are equal no current will flow in the thermocouple circuit but when they are unequal a proportionate flow will result. The current flow in the thermocouple circuit is indicated on a galvanometer 57 in series with the thermocouple lead 54. A pair of electrical contacts 58 in the galvanometer 57 are devised to close when the current indication reaches a predetermined value.

The balance between the potentiometer and thermocouple circuits and resultant current in the thermocouple circuit is determined by the position of the variable arm 56 of the slide wire rheostat. By moving this arm along the slide wire 53 the quantity of current that will flow in the thermocouple circuit at any specified temperature of the thermocouple 50 can be controlled. In operating the apparatus the arm 56 is set to cause the contacts 58 in the galvanometer to close when the temperature of the thermocouple reaches the maximum desired value. The contacts are part of a series circuit which includes a battery 59 and a coil 70 of a relay. When the contacts 58 close, the coil 70 is energized by current from the battery 59. The energized coil 70 closes the relay which connects a power source 80 to the solenoid 43. This action opens the magnetic valve 42 against the contained spring that normally holds the valve in a closed position. While the valve 42 is open the atomized water flows in the pipe line 41 and through the chambers in the die 15. This is continued until the extrudable material has been cooled to the desired degree. Cooling of the material affects the temperature of the thermocouple 50 and the resultant current flow in the thermocouple circuit. This current flow is reflected in the galvanometer indication. When the galvanometer indication is reduced sufficiently the contacts 58 open to deenergize the coil 70, release the relay and disconnect the solenoid 43, permitting the contained spring to close the valve 42 and interrupt circulation of the coolant.

The balance between the potentiometer and thermocouple circuits and the corresponding thermocouple temperature at which the contacts 58 will operate can be regulated easily by adjustment of the variable arm 56 in the slide wire rheostat. This facilitates close control of the cooling apparatus and permits any desirable changes to be made readily in the temperature of the extrudable material. The flexibility of this control and the effectiveness of the atomized water as a cooling medium operate to maintain the extrudable material accurately at any desired temperature required for maximum operating efficiency and high product quality.

Other modifications and adaptations of this invention will be apparent. It is feasible, for example, to control circulation of the atomized water manually or by the pressure actuated control disclosed in the above mentioned Larsen application, and portions or modification of the control apparatus disclosed herein can be employed to accomplish correspondingly limited results. It is understood that the invention is limited only by the scope of the appended claims.

What is claimed is:

1. In an apparatus for extruding heated material, an extrusion chamber having apertured walls, and a temperature control device for said chamber, comprising means for measuring the temperature of the chamber, means for mixing water and air in predetermined proportions, and means responsive to the temperature measuring means for circulating the mixture of water and air in the apertured wall of the chamber.

2. In an extrusion apparatus for heated material, a device for maintaining a portion thereof at a predetermined constant temperature comprising a wall enclosing said portion and having an elongated chamber therein, means for measuring the temperature of said portion, an aspirator for entraining water in air in predetermined proportions, and means responsive to the temperature measuring means for circulating the mixture of water and air in said elongated chamber.

3. In an extrusion apparatus for heated material, a device for maintaining a portion thereof at a predetermined constant temperature comprising a wall enclosing said portion and having an elongated chamber therein, a thermocouple for measuring the temperature of said portion, an aspirator for mixing water and air in predetermined proportions, a pipe line for conducting the mixture water to said chambers, and a magnetic valve in said pipe line responsive to the condition of the thermocouple for controlling the circulation of said water and air mixture in the chamber.

4. In an extrusion apparatus of the continuous type, an extrusion chamber having apertured walls, means for continuously supplying the chamber with matter to be extruded, and means for controlling the temperature of said matter comprising means for entraining water in air in predetermined proportions, and means for circulating the mixed air and water in said apertures in the walls of the chamber.

5. In an extrusion apparatus, a continuous extrusion chamber having apertured walls, means for continuously supplying the chamber with matter to be extruded, and means for controlling the temperature of said matter comprising means for entraining water in air in predetermined proportions, means for circulating the mixed air and water in the aperture in the walls of the chamber, and means responsive to the temperature of the chamber for regulating the quantity of mixed air and water delivered to said aperture.

6. In an extrusion apparatus, an extrusion chamber having an apertured wall, means for continuously supplying the chamber with matter to be extruded, and means for controlling the temperature of said matter comprising means for measuring the temperature of said matter, an aspirator for mixing water and air in fixed proportions, a pipe line for conducting the mixture of air and water to the chamber wall aperture, and a magnetic valve in said pipe line responsive to the condition of the temperature measuring means for regulating the flow of said mixture to the aperture.

7. In a lead extrusion apparatus of the continuous type, an extrusion chamber, a die in one end of the chamber, an end portion of the chamber having an apertured wall adjacent to the die, means for forcing heated lead through the chamber and die, a thermocouple in the chamber wall for measuring the temperature of the lead near the die, an aspirator for entraining water in air in predetermined proportions, a pipe for conducting the mixture of air and water to the aperture, a magnetic valve in the pipe for controlling the flow of the mixture to the aperture, and means responsive to the thermocouple for operating the magnetic valve.

ROBERT A. HARRIS.